1 2

3,492,151
METALLIZING PROCESS
Lawrence Anthony Cescon, New Castle County, Del., assignor to E. I. du Pont de Nemours and Company, Wilmington, Del., a corporation of Delaware
No Drawing. Filed Apr. 6, 1966, Ser. No. 540,482
Int. Cl. C23c 11/02
U.S. Cl. 117—93 11 Claims

ABSTRACT OF THE DISCLOSURE

A process for chemically metallizing a nonmetallic substrate while reducing the time and/or temperature required to metallize said substrate by sensitizing a metal salt/phosphine complex to thermal decomposition through the generation of free radicals. The sensitizing is achieved by subjecting the complex to irradiation or by incorporating into the complex a thermally dissociable free radical generator.

Metal-coated articles are presently enjoying wide utility. They are often conveniently obtained by chemical or nonelectrolytic methods, starting with a compound of the coating metal and converting it to the metal under controlled conditions. In U.S. Patent No. 3,438,805, E.M. Potrafke discloses a chemical metallizing process in which a metal salt/phosphine complex is thermally decomposed in the presence of a substrate at a temperature of 25° to 350° C. thereby metallizing the substrate. The process is suitable for a wide variety of substrates and is particularly useful for metallizing nonmetals such as plastics. For the metallization of nonmetal substrates, temperatures of about 100° to 350° C. are generally required. The process is somewhat limited when the substrate is a plastic since many plastics cannot withstand the metallization temperatures required by some of the metal salt/phosphine complexes. Thus there is a need for a method of reducing the temperature required to thermally decompose these complexes.

It is an object of this invention to provide a method of reducing the temperature required to metallize substrates by the thermal decomposition of metal salt/phosphine complexes. Another object is to provide a method of reducing the time required to metallize substrates by the thermal decomposition of metal salt/phosphine complexes. These and other objects will become apparent from the following description of this invention.

It has now been discovered that the temperature and/or time required to chemically metallize a nonmetallic substrate by heating a metal salt/phosphine complex derived from one mole of a nonorganometallic salt of copper, silver, gold, thallium or bismuth and about 1 to 4 moles of a triorgano phosphine, in which each organo group is a hydrocarbyl or dihydrocarbylamino radical, in substantially pure form in direct contact with the substrate to be metallized can be reduced by sensitizing the complex to thermal decomposition by generating free radicals. Free radicals can be produced by irradiating the complex with actinic light, a beam of subatomic particles or a spark discharge, or by incorporating into the metal salt/phosphine complex plating composition a thermally dissociable free radical generator. Reductions in metallization temperature of as much as 100° C. are commonly encountered as a result of the sensitization step of this invention.

In accordance with the metallization process taught in the Potrafke application, the metal salt/phosphine complex is heated in substantially pure form in direct contact with the substrate. By "substantially pure form" is meant undiluted by any significant amount of solvent, diluent or carrier. Minor amounts of impurities and additives are readily tolerated. By "metallization" is meant metal-coating and/or metal impregnating.

The direct contact between the complex in substantially pure form and the substrate is most conveniently provided by coating the substrate with the complex alone, especially in the case of a liquid complex, or by mixing the complex with a volatile carrier such as a solvent or diluent, coating the substrate with the mixture, evaporating the volatile carrier and heating the coated substrate thereby metallizing the substrate.

Because the metal salt/phosphine complexes are soluble in a wide variety of solvents, metal impregnates as well as coatings can be produced with a wide variety of polymeric substrates that are also soluble in such solvents and can be recovered and reconstituted by solvent evaporation. For impregnating a substrate such as plastic the metal salt/phosphine complex and a soluble polymer are dissolved in a mutual inert volatile solvent, the solvent is evaporated to form an intimate metal salt/phosphine-polymer mixture which is heated to produce the impregnated plastic. A solvent is chosen which softens, swells or dissolves the plastic substrate thereby allowing the plating components to penetrate the surface or to become completely and intimately associated therewith. Solutions of the metal salt/phosphine complex and the substrate polymer can be cast as films, spun into fibers or molded into any desired shape and, with evaporation of the solvent and heating, converted into a metallized product.

In accordance with the sensitization step of this invention free radicals may be generated by incorporating into the metal salt/phosphine complex plating composition a thermally dissociable free radical generator or by irradiating the complex with actinic light, a beam of subatomic particles or both as by contacting with a spark discharge.

When the addition of a free radical generator is used as the means of sensitizing the complex, it is convenient to add the free radical generator to a solution of the complex in an inert volatile solvent, coat the substrate with the solution, evaporate the solvent and heat the coated substrate, thereby generating free radicals which sensitize the complex whereby metallization occurs under milder conditions. A free radical generator should be chosen which generates free radicals at or below the sensitized metallization temperature.

Suitable thermally dissociable free radical generators include solvent soluble organic peroxides such as benzoyl peroxide, p-chlorobenzoyl peroxide, 2,4-dichlorobenzoyl peroxide, lauroyl peroxide, di(tert-butyl) peroxide, dicumyl peroxide, cyclohexane peroxide, methyl ethyl ketone peroxide, succinic acid peroxide and 2,5-dimethyl-2,5-di-tert-butylperoxyhexane; hydroperoxides such as tert-butyl hydroperoxide, cumene hydroperoxide, para-menthane hydroperoxide, pinane hydroperoxide, and 2,5-dimethylhexane-2,5-dihydroperoxide; and peroxy esters such as tert-butyl perbenzoate, di(tert-butyl) diperphthalate, tert-butyl peracetate, and isopropyl percarbonate. Other free radical generators including azo compounds such as azobisisobutyronitrile and bromides such as carbon tetrabromide, N-bromosuccinimide and N-bromoacetamide may also be used.

When irradiation is used as the sensitizing means, the substrate is first coated or impregnated with the complex and then the substrate is irradiated with or without a stencil. The radiation should be sufficiently energetic to form free radicals within the metal salt/phosphine/substrate composition. Suitable sources are those that produce intense actinic rays, especially those rich in the short wavelengths characteristic of ultraviolet light, such as a xenon tube. Conventional electron beam generators may also be used. Conveniently a spark discharge such as from a Tesla coil, which simultaneously produces ultraviolet light, electrons and ionized gases, can also be used to provide the energetic free radical producing radiation.

When the metallizing composition is sensitized by irradiation, the metal salt/phosphine complex itself or the non-metallic substrate can serve as the free radical source, or other substrances which readily form free radicals on being irradiated may be incorporated in the plating composition. Since many of the known thermally dissociable free radical generators are also dissociable into free radicals by irradiation, they can conveniently serve as the free radical source for both the radiation and thermal aspects of the process.

In one aspect of the invention the composition is irradiated with ultraviolet light which is rich in wavelengths shorter than 3000 A. In another aspect, a sensitizer which absorbs longer wavelength light, for example up to 5000 A., is incorporated into the composition and irradiation is carried out with such longer wavelength light. Suitable sensitizers for this purpose include phenazines such as phenazine and 1,2,3,4-tetrahydrophenazine; quinones such as anthraquinone, 9,10-phenanthrene-quinone, 3 - acetyl - 9,10 - phenanthrenequinone and naphthazarin; fluorescein and halo substituted fluoresceins such as Erythrosin, Rose Bengal, Eosin G and Phloxin N. These sensitizers, on being activated with light corresponding to the maximum absorption characteristic of the sensitizer, function as photooxidants, whereby they abstract hydrogen atoms from surrounding molecules thereby producing free radicals. Such photooxidants are particularly capable of producing free radicals from organic substrates that contain oxygenated groups such as ether, ester and alcoholic groups. Thus, if the substrate to be metallized does not contain such groups, a readily oxidized free radical source is preferably incorporated into the composition along with the sensitizer. Polyethylene ethers are especially suitable for use with photooxidant free radical generators.

It has also been found beneficial to incorporate into the metal salt/phosphine/non-metal substrate compositions, particularly in those containing gold complexes, a mild reducing agent such as ascorbic acid, tannic acid, 2,4-dinitrophenylhydrazine, 2-(para-methoxyphenyl)-4,5-diphenylimidazole, a hydroquinone such as hydroquinone, or pyrogallol, or a reducing sugar such as fructose. Such mild reducing agents further facilitate the sensitized metallization process.

The complexes used in accordance with this invention are derived in part from salts of copper, silver, gold, thallium, and bismuth. The salts should be non-organometallic salts, that is, salts which are free of carbon-metal bonds. As salts of these metals, the chlorides, bromides, iodides, cyanides, nitrites, nitrates, perchlorates, fluoroboraes, carbonates, or carboxylates such as acetates and trifluoroacetates are commonly available and conveniently used.

The complexes are also derived in part from triorgano phosphines in which each organo group is a hydrocarbyl or dihydrocarbylamino radical. Each of the hydrocarbyl groups, including those in the dihydrocarbylamino radical, may be aliphatic, cycloaliphatic or aromatic and, for reasons of availability and economy, normally contain from about 1 to 10 carbon atoms, but may contain up to about 18 carbon atoms. These groups may be straight-chain, branched-chain, saturated or unsaturated including ethylenic and acetylenic unsaturation. Exemplifying such groups are methyl, ethyl, n-propyl, isopropyl, n-butyl, isobutyl, sec-butyl, tert-butyl, amyl, hexyl, octyl, decyl, dodecyl, hexadecyl, octadecyl, propenyl, allyl, butenyl, propargyl, octadecenyl, cyclopentyl, cyclohexyl, cyclohexenyl, phenyl, tolyl, xylyl, ethylphenyl, styryl, and dodecylphenyl. The trialkyl phosphines are preferred, particularly the trilower alkyl phosphines having from about 1 to 5 carbon atoms in each alkyl group.

The hydrocarbyl secondary amino groups are preferably, for reasons of availability and economy, di-lower alkylamino groups where each alkyl has from about 1 to 5 carbon atoms, such as dimethylamino, diethylamino, methylethylamino, dibutylamino, methyl amylamino and diamylamino. Suitable homologs and analogs includes dioctylamino, methyloctadecylamino, ethyloctadecenylamino, methyl cyclopentyl amino, methyl cyclohexyl amino, octyl cyclohexylamino, dicyclohexylamino, N-methylanilino, N-ethylanilino and N-methyl toluidino. The hydrocarbyl group may also constitute a single divalent radical such as pyrrolidino and piperidino radicals.

The process of this invention may be carried out using a preformed metal salt/phosphine complex, or the complex may be prepared in situ by adding the metal salt and phosphine separately to a solvent in which the complex is soluble. In either case, the complex is formed and acts as a necessary component in the process. When the complex is formed in situ, small excesses of metal salt or phosphine may be present. These do not interfere with the metallization process.

As is well known in the art, phosphines and heavy metal salts generally form definite coordination complexes involving from 1 to 4 moles of the phosphine per mole of the salt. For efficient utilization of the metal salt in forming the complex in situ, the phosphine is normally present in amounts corresponding to at least about one mole per mole of metal salt. More than about four moles of the phosphine per mole of salt is generally not needed but may be used, if desired. The optimum amount of the phosphine may vary depending on the particular metal salt and the substrate to be coated. Usually, however, only about two moles of the phosphine are needed per mole of salt and only about one, particularly in the case of copper, silver and gold.

In general, the metal salt/phosphine complexes decompose to form metal at temperatures below about 350° C. As a class, the triaryl phosphine complexes are thermally more stable than the trialkyl phosphine complexes and require higher metallization temperatures. This may be advantageously used where enhanced thermal stability of a complex is needed as in controlled and step-wise metal deposition. Thus the wide variety of phosphines that are available enables one to control or vary the temperature of metallization to suit the particular processing need.

The metal salt/phosphine complexes are highly soluble in a wide variety of organic solvents making possible the formulation of a wide range of plating compositions. The solvent should be volatile and substantially inert to the plating ingredients and the substrate. Suitable solvents include alcohols such as methanol, ethanol, 2-propanol and 2-methyl-1-propanol; ethers such as diethyl ether, furan, tetrahydrofuran and dioxane; ketones such as acetone and methyl ethyl ketone; hydrocarbons such as pentane, hexane, isooctane, tetradecane, benzene, xylene and toluene; halogenated hydrocarbons such as chloroform, methylene chloride, carbon tetrachloride, chlorobenzene, dichlorobenzene, trichloroethylene, 1,1,2,2-tetrachloro-1,2-difluoroethane, 1,1,2-trichloro - 1,2,2-trifluoroethane, trichlorofluoromethane, chlorotrifluoromethane and mixtures and azeotropes thereof; nitriles such as acetonitrile, butyronitrile and benzonitrile; amines such as triethylamine, tributylamine, pyridine and the picolines; amides such as dimethylformamide, dimethylacetamide, hexamethylphosphoramide and hexaethylphosphoramide; and esters such as ethyl acetate, butyl acetate, and amyl acetate.

The main function of the solvent is to provide liquid, easily handled compositions which can effectively bring the metal salt/phosphine complex in intimate contact with the substrate to be metallized. The solvent may also serve to transfer heat to the metallizing components and as a vehicle for other ingredients having beneficial effects such as free radical generators, plating promoters and surface conditioners. Solvents should be used which can be evaporated from the metallizing compositions at temperatures at or below the temperature at which metallization occurs.

The improved method of this invention can be applied to a wide variety of non-metallic substrates. Suitable substrates include siliceous solids such as glass, Pyrex glass, spun glass, and asbestos; carbonaceous materials such as graphite and the various amorphous carbon blacks; refractory materials such as carborundum, ceramics and cermets; natural and synthetic cellulosic materials such as cotton, hemp, jute, paper, parchment, wood, cellulose acetate and rayon; proteinaceous materials such as silk, wool, leather, mohair and fur. Still other important substrates are the synthetic polymeric compositions exemplified by the polyvinyls such as polyacrylonitrile, polyvinyl chloride, polytrifluorochloroethylene, polytetrafluoroethylene, polystyrene, polyethylene, polypropylene, polyvinyl acetate, polyvinylidene fluoride, poly(alkyl methacrylates) and copolymers thereof; polybutadiene, poly(diallyl esters) such as poly(diallyl phthalate), polyamides such as nylon, polyimides, polyesters, polyurethanes, polyacetals, melamine-formaldehyde, ureaformaldehyde, phenol-formaldehyde, and epoxies. When the substrate is a formed polymeric material, the metallization temperature should be below the deformation temperature of the polymer.

The substrate may be particulate, for example powdered, or it may have a continuous surface in the form of a sheet, film, tape, filament, fiber, fabric or foam. It may be a highly surface porous mass which is to be impregnated and coated at the same time such as a porous catalyst structure.

As is well known in the plating art, for best results the substrate to be plated should be clean especially with respect to grease. Any of the known techniques may be used to prepare the surface to be coated. Plastic surfaces can be preconditioned according to known techniques. For example, the surface can be mechanically "satinized" as described by Bruner and Baranano in Modern Plastics, December, 1961, and in Chemical and Engineering News, Mar. 25, 1963, pages 48 and 49. Or the surfaces may be chemically etched, as in the case of polyfluoroethylene being treated with an alkali metal-amine solution as described in Canadian Patent No. 653,304, or with an alkali metal-aromatic-ether solution as described in U.S. Patent No. 2,809,130.

It is often beneficial to condition the surfaces to be plated with conditioners such as the commonly employed hydrohalic acids including hydrochloric, hydrobromic, hydrofluoric and hydroiodic acids or sulfuric acid, or by treating with a small amount of an inorganic reducing salt such as stannous chloride. Such promoters may be incorporated directly into the metal salt/phosphine plating composition of this invention, if desired. Conveniently this may be done in a carrier solvent, especially alcohols such as methyl, ethyl, and propyl alcohols.

The improved method of this invention is particularly useful with substrates which have decomposition or deformation temperatures below about 350° C. The sensitization step of this invention allows metallization of these substrates with a wider range of complexes than would otherwise be possible. This improvement is also useful where a nonuniform coating is desired such as in the creation of ornamental or decorative effects and in the production of printed circuits. In this case irradiation would be the suitable method of sensitization.

The following examples, illustrating the novel method disclosed herein for sensitizing metal salt/phosphine complexes for metallizing, are given without any intention that the invention be limited thereto. In these examples, all parts and percentages are by weight and solutions of metal salt/phosphine complexes, where employed, were prepared and used in nonmetallic (usually glass) containers. Preformed metal salt/phosphine complexes, where used, were prepared by known methods. Adherence of the metal coatings to the substrate was measured by the Scotch tape cross-hatch test.

EXAMPLE 1

One part of $(CH_3)_3P\cdot AuCl$ is dissolved in 25 parts of a 15% solution of Orlon polyacrylonitrile in dimethylformamide. The solution is spread on a glass microscope slide and warmed with a heat lamp to evaporate the dimethylformamide. The slide is then exposed to a Tesla coil spark discharge to sensitize the gold salt complex to thermal decomposition and placed, treated side up, on a 200° C. hotplate for about 5 minutes. The resulting uniformly distributed golden coating is adherent to the glass and electrically conductive.

EXAMPLE 2

Example 1 is repeated with 1 part of $(CH_3)_3P\cdot AuCl$ per 5 parts of poly[4,4'(hexafluoroisopropylidene)diphenolisophthalate] polyester as the carrier substrate in 100 parts of methylene chloride. The resulting film, after being exposed to the spark discharge and heated at 200° C. for two minutes, is golden, adherent and electrically conductive.

Such products are useful in printed circuitry for use at elevated temperatures.

EXAMPLE 3

The procedure of Example 2 is repeated except that a piece of porcelain is used in place of the glass slide with substantially the same result.

EXAMPLE 4

The procedure of Example 2 is repeated except that a piece of wood is used in place of the glass slide with substantially the same result.

EXAMPLE 5

The procedure of Example 2 is repeated except that a carbon sheet is used in place of the glass slide with substantially the same result.

EXAMPLE 6

The procedure of Example 2 is repeated except that a piece of ceramic is used in place of the glass slide with substantially the same result.

EXAMPLE 7

Repeating Example 2 with 0.5 part of the gold complex produces uniformly colored purple slides, indicating that colloidal gold is dispersed throughout the polymeric film, which are useful as interference filters.

EXAMPLE 8

A $(Ch_3)_3P\cdot AuCl$/polyacrylonitrile/dimethylformamide solution substantially as described in Example 1 is spread on a glass slide and a dimethylformamide evaporated by warming under a heat lamp. The resulting film is then covered with a stencil, irradiated with high intensity light by contact flashing with a 200 watt-second xenon flash tube (Hico lite, Model K; one millisecond duration flash), and heated at 100° C. for about 5 minutes. The resulting slide shows a lustrous, electrically conductive, adherent golden image corresponding to the irradiated areas.

EXAMPLE 9

Example 8 is repeated employing $[(C_4H_9)_3P]_2\cdot BiCl_3$, prepared by mixing the phosphine and the salt in ethyl ether solution. Irradiating with ultraviolet light rich in the 2537 A. wavelength and heating the cast film produces a bismuthized image.

EXAMPLE 10

A mixture of 1 part of $(CH_3)_3P\cdot AgNO_2$ and 70 parts of film-forming polyvinylchloride cast as a film on glass from dimethylformamide solution is irradiated 3 times through a stencil with the light source described in Example 8 and then heated to 180° C. for 5 minutes to develop a silvery image. The silver deposit is much less noticeable in the unirradiated area.

EXAMPLE 11

The procedure of Example 10 is repeated except that one part of $(C_4H_9)_3P\cdot AgClO_4$ is used as the silver complex with the same result.

EXAMPLE 12

The procedure of Example 10 is repeated except that one part of $(C_6H_5)_3P\cdot AgOC(O)CH_3$ is used as the silver complex with the same result.

EXAMPLE 13

The procedure of Example 10 is repeated except that one part of $(C_4H_9)_3P\cdot AgI$ is used as the silver complex with the same result.

EXAMPLE 14

The procedure of Example 10 is repeated except that one part of $(C_6H_5)_3P\cdot AgOC(O)CF_3$ is used as the silver complex with the same result.

EXAMPLE 15

The procedure of Example 10 is repeated except that one part of $[(C_6H_5)_3P]_2\cdot Ag_2CO_3$ is used as the silver complex with the same result.

EXAMPLE 16

The procedure of Example 10 is repeated except that one part of $(C_4H_9)_3P\cdot AgCN$ is used as the silver complex with the same result.

EXAMPLE 17

The procedure of Example 10 is repeated except that one part of $(C_6H_5)_3P\cdot AgNO_3$ is used as the silver complex with the same result.

EXAMPLE 18

Example 10 is repeated using $(C_4H_9)_3P\cdot Tl(I)$ acetate, prepared by mixing the salt and the phosphine in ethyl ether, evaporating off the solvent, and adding petroleum ether to produce crystals, M.P. 124° to 127° C., polyvinyl chloride, and acetonitrile as the carrier solvent. Irradiating through a stencil with ultraviolet light rich in the 2537 A. wavelength for 12 minutes and heating briefly at 125° C., produces a metallic image.

EXAMPLE 19

A small catalytic amount of carbon tetrabromide is added to the liquid complex $(C_4H_9)_3P\cdot AuCl$, and the mixture is spread on a silicon wafer which is then heated on a 180° C. hot plate. In considerably less than 5 minutes, the wafer becomes coated with an adherent, electrically conductive gold layer. When cooled, the resistance of the wafer is less than 0.5 ohm/cm.$^2$, or less than 1/1000 of the original resistance.

When the above procedure is repeated except that the carbon tetrabromide is omitted, it takes about 5 minutes for the coating to appear.

EXAMPLE 20

An acetone solution (0.5 ml.) containing 1% each of $(CH_3)_3P\cdot AuCl$ and $CBr_4$ is applied to a 2.5 inch diameter area of Whatman No. 1 filter paper. The paper is air dried, exposed to 6 flashes of ultraviolet light from a Speed Center Mighty Light Delux Model 1, allowing 10 seconds between flashes, and briefly heated at about 160° C. to produce a gold-impregnated area.

EXAMPLE 21

A stock metallizing composition is prepared containing 2.5 mg. of $(CH_3)_3P\cdot AuCl$, 200 mg. of Carbowax 20M, 1.88 mg. of maleic acid and 143 mg. of ascorbic acid in methanol totalling 3 ml. of solution. Whatman No. 1 filter paper is spotted with 0.6 ml. of this solution giving a concentration of the complex of 0.5 mg. per square inch, air dried to evaporate the methanol, exposed to 4 flashes of ultraviolet light from a Speed Center Mighty Light Delux Model 1, allowing 10 seconds between flashes, and heated at 140° C. for 1 minute to develop a heavy gold coloration.

EXAMPLE 22

An aliquot of a stock solution, prepared by mixing 50 mg. of $(CH_3)_3P\cdot AuCl$, 22.5 mg. of malonic acid, and 30 mg. of pyrogallol with 10 ml. of methanol containing 5 gms. of Carbowax 20M and 10 ml. acetone containing 1 gm. of cellulose acetate, is coated on polyacrylonitrile-impregnated Whatman No. 1 filter paper. After the methanol and acetone have evaporated, the coating is irradiated through a stencil with 2500 A. ultraviolet light from a germacidal lamp and heated at 160° C. for 1 minute to develop a violet gold image.

EXAMPLE 23

Phenazine, which has an absorption peak at 3600 A., is added to a metallizing composition consisting of 2.5 mg. of $(CH_3)_3P\cdot AuCl$ and 125 mg. of Carbowax 20M per ml. of methanol in an amount just sufficient to color the solution yellow. Whatman No. 1 filter paper is impregnated with the solution and air dried. The impregnated paper is then covered with a microscope glass slide, which effectively cuts out wavelengths below 3000 A. Irradiating with light from a Mighty Light lamp as described in Example 21 and heating for about 2 minutes at 160° C. develops a colloidal violet gold display.

Repeating the above example but without the phenazine and without the glass slide, gold is likewise produced. In a control run with only the phenazine omitted, substantially no gold is produced on irradiating through the glass slide, thus showing the sensitizing effect of the phenazine.

Thus, it should be apparent from the above examples that this invention has wide utility. It is useful to produce flexible, electrically conductive metal coatings. For example, it is useful to produce (1) metallic coatings that protect the underlying material and that reflect light and infrared radiation; (2) electrically conductive articles such as printed circuits, resistors, capacitors, and electrodes for fuel cells and batteries; (3) various decorative pieces (e.g., automotive hardware), effects, and images based on the formation of metal surfaces; (4) new catalyst structures wherein a catalytically active metal is impregnated and coated on a porous substrate carrier; and (5) metallized films showing selective light transmission which can be used as optical filters. It is also useful to produce metallized plastics wherein the metal is uniformly distributed throughout the body of the plastic as well as on its surface. This is of great practical advantage when the surface of the plastic is normally subjected to abrasion.

The embodiments of the invention in which an exclusive property or privilege is claimed are defined as follows:

1. In the method of chemically metallizing a nonmetallic substrate by heating a metal salt/phosphine complex derived from one mole of a non-organometallic salt of copper, silver, gold, thallium or bismuth and 1 to 4 moles of a triorganophosphine, in which each organo group is a hydrocarbyl or dihydrocarbylamino radical, in substantially pure form in direct contact with the substrate to be metallized at a temperature of 100° to 350° C., the improvement which comprises sensitizing the complex to thermal decomposition thus reducing either the temperature or time at which metallization occurs, by subjecting said complex to irradiation selected from the group consisting of actinic light and a beam of subatomic particles.

2. The improvement of claim 1 in which the irradiation is actinic light.

3. The improvement of claim 2 in which the actinic light is ultraviolet light.

4. The improvement of claim 3 in which the complex is derived from a salt of silver or gold and a tri-lower alkyl phosphine.

5. The improvement of claim 1 in which the irradiation is a beam of subatomic particles.

6. The improvement of claim 1 in which the irradiation is a spark discharge.

7. In the method of chemically metallizing a non-metallic substrate by heating a metal salt/phosphine complex derived from one mole of a non-organometallic salt of copper, silver, gold, thallium or bismuth and 1 to 4 moles of a triorganophosphine, in which each organo group is a hydrocarbyl or dihydrocarbylamino radical, in substantially pure form in direct contact with the substrate to be metallized at a temperature of 100° to 350° C., the improvement which comprises sensitizing the complex to thermal decomposition thus reducing either the temperature or time at which metallization occurs, by incorporating into said complex a thermally dissociable free radical generator selected from the group consisting of an organic peroxide, azobisisobutyronitrile, and a bromide selected from carbon tetrabromide, N-bromosuccinimide and N-bromoacetamide.

8. The improvement of claim 7 in which the complex is derived from a salt of silver or gold and a tri-lower alkyl phosphine.

9. The improvement of claim 8 in which the substrate is a plastic material.

10. The improvement of claim 9 in which a solution containing the metal salt/phosphine complex and free radical generator selected from the group consisting of an organic peroxide, azobisisobutyronitrile and a bromide selected from carbon tetrabromide, N-bromosuccinimide and N-bromoacetamide, in a volatile inert solvent is coated on the substrate and the solvent is evaporated.

11. The improvement of claim 9 in which the metal salt/phosphine complex, free radical generator selected from the group consisting of an organic peroxide, azobisisobutyronitrile and a bromide selected from carbon tetrabromide, N-bromosuccinimide and N-bromoacetamide, and a polymer are dissolved in a mutual inert volatile solvent, said polymer being soluble in and recoverable from said solvent by evaporation, and evaporating the solvent to form an intimate salt/phosphine/polymer mixture.

References Cited

UNITED STATES PATENTS 2,909,544 10/1959 Birum ............ 260—438.1

ALFRED L. LEAVITT, Primary Examiner

C. K. WEIFFENBACH, Assistant Examiner

U.S. Cl. X.R.

117—93.3, 160